(12) United States Patent
Haney et al.

(10) Patent No.: US 9,494,407 B2
(45) Date of Patent: Nov. 15, 2016

(54) TRIP HAZARD MEASUREMENT GAUGE

(71) Applicants: Matthew B. Haney, Cedar Hills, UT (US); Michael E. Lamb, American Fork, UT (US); Aaron C. Ollivier, Pleasant Grove, UT (US); Daniel J. Triplett, Providence, UT (US)

(72) Inventors: Matthew B. Haney, Cedar Hills, UT (US); Michael E. Lamb, American Fork, UT (US); Aaron C. Ollivier, Pleasant Grove, UT (US); Daniel J. Triplett, Providence, UT (US)

( * ) Notice: Subject to any disclaimer, the term of this patent is extended or adjusted under 35 U.S.C. 154(b) by 204 days.

(21) Appl. No.: 14/289,654

(22) Filed: May 29, 2014

(65) Prior Publication Data

US 2015/0345928 A1   Dec. 3, 2015

(51) Int. Cl.
   *G01B 5/18*   (2006.01)
(52) U.S. Cl.
   CPC ........................................ *G01B 5/18* (2013.01)
(58) Field of Classification Search
   CPC ................ G01B 3/08; A61B 2019/468; A61B 5/107
   USPC ........................................... 33/511, 512, 832
   See application file for complete search history.

(56) References Cited

U.S. PATENT DOCUMENTS

| | | | | |
|---|---|---|---|---|
| 1,371,281 A * | 3/1921 | Weber | ................... | A61B 5/1072 33/512 |
| 2,125,530 A * | 8/1938 | Verdier | ................... | A41H 1/04 33/512 |
| 3,196,548 A * | 7/1965 | Moore | ................... | G01B 3/08 33/833 |
| 3,492,737 A * | 2/1970 | Swanson | ................... | G01B 3/08 33/666 |
| 5,168,637 A * | 12/1992 | Gibson | ................ | B23D 59/001 33/628 |
| 5,491,907 A * | 2/1996 | Vidmar | ................... | G01B 5/061 33/810 |
| 5,915,810 A * | 6/1999 | Cameron | ................... | G01B 3/08 33/295 |
| 6,226,881 B1 * | 5/2001 | Landauer | ............... | G01B 5/061 33/511 |
| 6,314,657 B2 * | 11/2001 | Kroll et al. | ............. | G01B 5/14 33/600 |
| 6,418,631 B1 * | 7/2002 | Ramsthaler | ............ | B43K 23/00 33/41.4 |
| 7,543,395 B2 * | 6/2009 | Silberman | ................ | G01B 3/08 33/832 |

(Continued)

*Primary Examiner* — Yaritza Guadalupe-McCall
(74) *Attorney, Agent, or Firm* — Angus C. Fox, III

(57) ABSTRACT

A trip hazard measurement gauge has an outer tube with a stationary foot secured to a lower end thereof, and an inner tube slidable within the outer tube and extending through an upper end of the latter. The inner tube has a slidable foot secured to a lower end thereof and a ruler secured to an upper end thereof. The inner tube is spring biased in a downwardly direction. With the inner tube positioned at its downward limit, the stationary foot and the movable foot are equiplanar and the ruler is hidden inside the outer tube. An estimator measures a difference in elevation between two adjacent concrete slabs by placing the slidable foot on an adjoining edge of the uppermost slab and pushing down on the outer tube until the stationary foot contacts the lowermost slab. The ruler, extending upwardly from the outer tube, indicates the difference in elevation.

18 Claims, 4 Drawing Sheets

(56) References Cited

U.S. PATENT DOCUMENTS

| | | | | |
|---|---|---|---|---|
| 8,898,924 | B2* | 12/2014 | Zhang | G01B 3/22 |
| | | | | 33/542 |
| 2011/0167658 | A1* | 7/2011 | Chul | A61B 5/1072 |
| | | | | 33/512 |
| 2011/0289788 | A1* | 12/2011 | Steffensen | G01C 15/06 |
| | | | | 33/296 |
| 2013/0133214 | A1* | 5/2013 | Steffensen | G01C 15/06 |
| | | | | 33/296 |
| 2015/0198440 | A1* | 7/2015 | Pearlman | G01S 17/023 |
| | | | | 356/4.01 |

* cited by examiner

TRIP HAZARD MEASUREMENT GAUGE

FIELD OF THE INVENTION

This invention relates, generally, to measurement devices and, more particularly, to gauges used to measure a difference in elevation between two adjacent objects.

BACKGROUND OF THE INVENTION

The Americans with Disabilities Act (ADA), which was signed into law as §12181 of Title 42 of the United States Code on Jul. 26, 1990, is a wide-ranging legislation intended to make American society more accessible to people with disabilities. The law, which took effect on Jul. 26, 1992, mandates, among other things, standards for access to public facilities, including public sidewalks. The law not only requires that curb cuts be made at intersections and crosswalks to facilitate wheelchair access, but also mandates specifications for slopes and transitions between two surfaces of different levels. Some of the relevant provisions of the law are as follows:

4.5.2 Changes in Level. Changes in level up to ¼ inch (6 mm) may be vertical and without edge treatment. Changes in level between ¼ inch and ½ inch (6 mm and 13 mm) shall be beveled with a slope no greater than 1:2. Changes in level greater than ½ inch (13 mm) shall be accomplished by means of a ramp that complies with 4.7 or 4.8.

4.7.2 Slope. Slopes of curb ramps shall comply with 4.8.2. Transitions from ramps to walks, gutters, or streets shall be flush and free of abrupt changes. Maximum slopes of adjoining gutters, road surface immediately adjacent to the curb ramp, or accessible route shall not exceed 1:20.

4.8.1 General. Any part of an accessible route with a slope greater than 1:20 shall be considered a ramp and shall comply with 4.8.

4.8.2 Slope and Rise. The least possible slope shall be used for any ramp. The maximum slope of a ramp in new construction shall be 1:12. The maximum rise for any run shall be 30 inches (760 mm). Curb ramps and ramps to be constructed on existing sites or in existing building or facilities may have slopes and rises as allowed in 4.1.6(3)(a) if space limitations prohibit the use of a 1:12 slope or less.

4.1.6(3)(a)1. A slope between 1:10 and 1:12 is allowed for a maximum rise of 6 inches.

4.1.6(3)(a)2. A slope between 1:8 and 1:10 is allowed for a maximum rise of 3 inches. A slope steeper than 1:8 is not allowed.

Historically, trip hazards caused by uneven lifting and settling of contiguous sidewalk sections have been eliminated either by tearing out the old concrete and replacing it with new slabs having no abrupt transitions between joints, by forming a transition ramp on the lowermost section with macadam, or by creating a chamfer on the edge of the uppermost section. The first method represents the most expensive fix. The second method, which uses dark-colored macadam on a light-colored sidewalk, is unsightly. If the chamfer is made using a surface cutter or grinder, the second method is slow, given that all material removed through grinding must be pulverized. In addition, if the process is performed with a drum cutter, the equipment is relatively expensive and leaves a rough surface. In addition, most equipment used heretofore is incapable of removing the trip hazard over the entire width of a sidewalk. Furthermore, if two adjacent sidewalk slabs have twisted in opposite directions as they have settled or raised, it may be necessary to create a ramp across a portion of the width of the sidewalk on both sides of the joint.

U.S. Pat. No. 7,402,095 to M. Ballard Gardner (Gardner '095), dated Jul. 22, 2008, provides a method and apparatus that reduces the time and cost required to form chamfers on uneven, contiguous sidewalk slabs. The method and apparatus are capable of removing a trip hazard over the entire width of a sidewalk, and of chamfering portions of two intersecting slabs at a common joint. The method of Gardner '095 employs a right-angle grinder motor, to which a circular, diamond-edged cutting blade has been flush mounted, to slice off the trip hazard at an angle that complies with the ADA.

Because the time, effort and cost required to remove a particular trip hazard depend on the amount of concrete that must be cut, it is important to accurately estimate a job beforehand so that the party who will perform the work can accurately estimate the time required to complete the job, and provide an accurate cost estimate to the paying party. As the time required to perform any chamfer cut is directly related to the surface area of the cut, it is essential to calculate the surface area for each chamfer cut to be made during the estimating process. The surface area of a chamfer cut is a function of both the average thickness, at the adjoining edge of the slab, of the concrete to be removed, and the maximum slope permitted by the ADA under §4.1.6(3)(a)1 and §4.1.6(3)(a)2. For the sake of transparency in the estimating process, each proposed cut must be identified by location and projected cost.

In order to accurately estimate the surface area of a chamfer cut, the estimator must calculate the width and average length of each cut. As the average length of a cut is typically a function of the average difference in height between two adjoining concrete slabs, it is imperative that the estimator determine the average difference in height for each cut. Such a calculation has, heretofore, been performed by an estimator kneeling at the site of a potential cut and measuring the average height of the trip hazard with a straight edge and a tape measure. The straight edge is used to project the surface of the more elevated slab over the edge of the lower-lying slab, where the measurement is made. Such a procedure is time consuming, and requires the estimator to kneel at the location of each proposed cut.

What is needed is a gauge that will enable an estimator to measure variations in the levels of two adjacent concrete slabs while standing. In addition, the estimator will also be able to record the measurement data, as well as the location, for each proposed cut in a convenient manner so that calculations may be later made and transformed into a quote for the customer.

SUMMARY OF THE INVENTION

The new trip hazard measurement gauge has an outer tube with a stationary foot secured to a lower end thereof, an inner tube slidable within the outer tube and extending through an upper end of the latter. The upper end of the inner tube is equipped with a ruler marked in measurement units. The inner tube has a movable foot secured to a lower end thereof. The inner tube is spring biased in a downwardly direction, so that when the inner tube is positioned at its downward limit, the stationary foot and the movable foot are equiplanar and the rule is completely hidden inside the outer tube. The gauge is utilized by an estimator to rapidly measure the difference in elevation between two adjacent concrete slabs by placing the movable foot on an adjoining edge of the uppermost slab and pushing down on the outer tube until the stationary foot contacts the lowermost slab. The difference in elevation is indicated by the ruler, which extends upwardly from the outer tube. In order to enhance the accuracy of the measurements, the gauge is equipped with a bubble leveling instrument so that the estimator can ascertain when the gauge is vertical. The gauge is optionally equipped with a device holder. A small GPS-equipped tablet computer or GPS-equipped smartphone can be secured in the device holder. Measurement data is input using the secured device. Whenever measurement data is recorded using a program running on the GPS-equipped device, the geographic location of the device, as determined by its GPS receiver, is appended to the measurement data. This feature greatly aids in the creation of quote documents for customers. To facilitate transport of the gauge, a shoulder strap can be secured to the outer tube.

PREFERRED EMBODIMENT OF THE INVENTION

Figure 1:
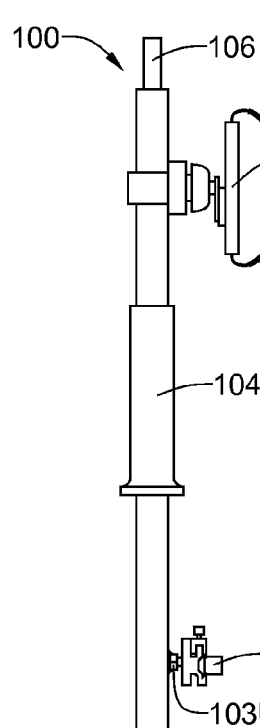
FIG. 1 is a side elevational view of the trip hazard measurement gauge.
Figure 2:
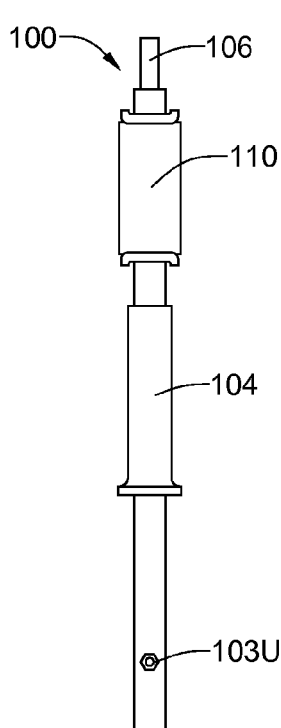
FIG. 2 is a front elevational view of the trip hazard measurement gauge of FIG. 1.
Figure 3:
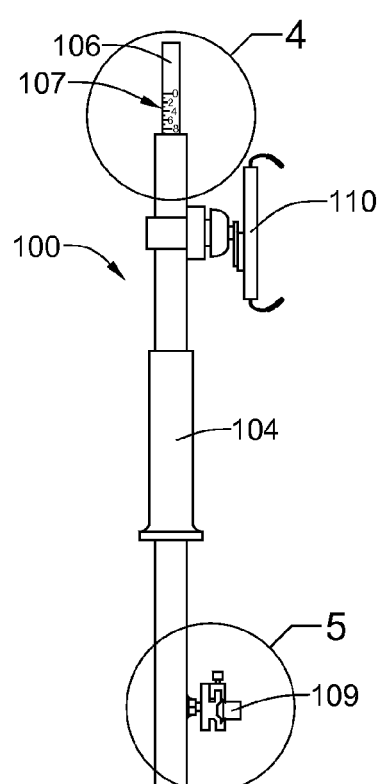
FIG. 3 is a side elevational view of the trip hazard measurement gauge of FIG. 1 after raising the movable foot and the inner tube to which it is secured.

The new trip hazard measurement gauge will now be described in detail, with reference to the attached drawing figures. Though a prototype trip hazard measurement gauge, manufactured in accordance with the present invention, is about 152 cm in height (roughly 60 inches), the ideal height of the gauge is determined by the height of the user. In order to better show details of the gauge, the drawing FIGS. 1, 2, 3, 7 and 8 are vertically compressed and, hence, are not drawn to scale Referring now to FIGS. 1, 2 and 3, the trip hazard measurement gauge 100 has an outer tube 101 with a stationary foot 102 secured to a lower end thereof. The outer tube 101 is equipped with an upper threaded nut mount 103U and a lower threaded nut mount 103L. A hand grip 104 is slipped over and secured to the outer tube 101. The trip hazard measurement gauge 100 also has an inner tube 105, of preferably square cross-section, that is slidable within the outer tube 101 and extends through an upper end of the latter. The upper end 106 of the inner tube is equipped with a rule 107 marked in measurement units. The inner tube 105 has a movable foot 108 secured to a lower end thereof. The inner tube 105 is spring biased in a downwardly direction, so that when the inner tube 105 is positioned at its downward limit, the stationary foot 102 and the movable foot 108 are equiplanar and the rule 107 is completely hidden inside the outer tube 101. The topmost portion of the outer tube 101 can be swaged, crimped, or otherwise formed, to achieve a square opening that fits with a close, non-interference fit around the inner tube 105. The trip hazard measurement gauge 100 is utilized by an estimator to rapidly measure the difference in elevation between two adjacent concrete slabs by placing the movable foot 108 on an adjoining edge of the uppermost slab and pushing down on the outer tube 101 until the stationary foot 102 contacts the lowermost slab. The difference in elevation is indicated by the rule 107, which extends upwardly from the outer tube 101. In order to enhance the accuracy of the measurements, the gauge is equipped with a bubble leveling instrument 109 that is secured to the upper threaded nut mount 103U. The bubble leveling instrument 109 enables an estimator to ascertain when the trip hazard measurement gauge 100 is plumb. The trip hazard measurement gauge 100 is optionally equipped with a device holder 110. A small GPS-equipped tablet computer or GPS-equipped smartphone can be secured in the device holder 110. Measurement data is input using the secured device. Whenever measurement data is recorded using an application program (app) running on the GPS-equipped device, the geographic location of the device, as determined by its GPS receiver, is appended to the measurement data. This feature greatly aids in the creation of quote documents for customers. To facilitate transport of the trip hazard measurement gauge 100, a shoulder strap can be secured to the lower threaded nut mount 103L. The lower threaded nut mount 103L is equipped with the same thread as the tripod mount of a camera. Thus, the threaded fastener of shoulder straps designed for cameras will attach directly to the lower threaded nut mount 103L. A Caden™ wide neck strap, available from Amazon.com and other online retailers, functions well as a shoulder strap for the trip hazard measurement guide 100. A machine screw 111, inserted through and secured within aperture 117 at the bottom of the outer tube 101 provides a lower anchor for an extension coil spring 112 (seen in FIG. 4).

Figure 4:
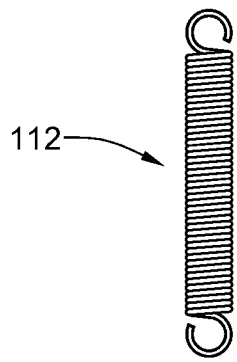
FIG. 4 is an elevational view of an extension coil spring.
Figure 5:
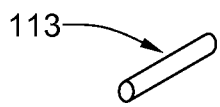
FIG. 5 is an isometric view of a cylindrical pin.
Figure 6:
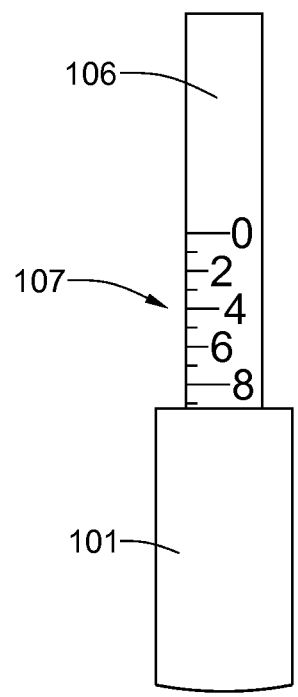
FIG. 6 is a 4× close-up view of the circular area 4 of FIG. 3 showing the rule in a partially elevated position.

Referring now to FIG. 4, an extension coil spring 112 is shown at a 4× scale that is the same as the scale of the enlarged partial drawings of FIGS. 5 and 6.

Referring now to FIG. 5, a cylindrical pin 113 will be inserted within the aperture 115 and peened at both ends to provide an upper anchor for the extension coil spring 112.

Referring now to FIG. 6, the upper end of the trip hazard measurement gauge 100 is shown in an enlarged view. Although the scale is marked in eight-inch increments, a scale marked in metric units is an option.

Figure 7:
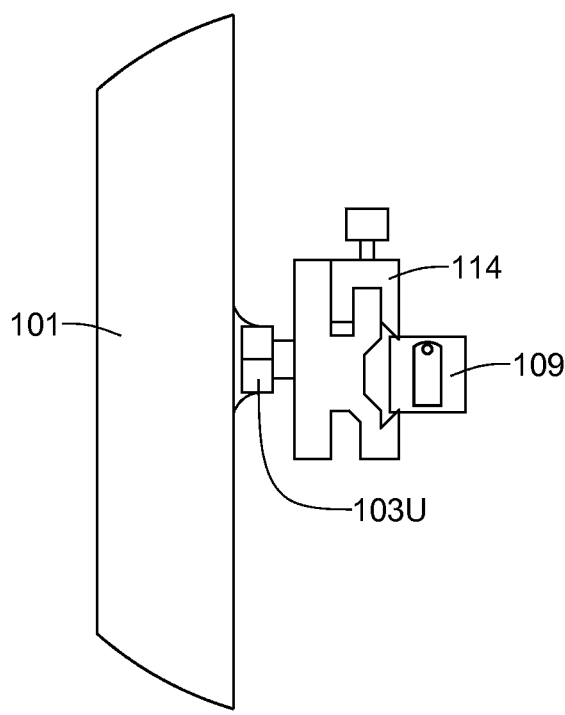
FIG. 7 is a 4× close-up view of the circular area 5 of FIG. 3 showing the bubble leveling instrument.

Referring now to FIG. 7, details of the bubble leveling instrument 109 and the two piece clamp 113 that holds the bubble level instrument 109 and secures the latter device to the upper threaded nut mount 103U are shown.

Figure 8:
FIG. 8 is a side elevational view of the inner tube.

Referring now to FIG. 8, the inner tube 105 is shown in its entirety. The complete rule 107 is visible, as is an aperture 114, through which the cylindrical pin 113 of FIG. 5 is inserted. When peened on both ends, the cylindrical pin 113 functions as a an upper anchor for the extension coil spring 112. With the extension coil spring 112 under tension between the cylindrical pin and the machine screw 111, the inner tube 105 is downwardly biased so that the bottom of the stationary foot 102 is equiplanar with the movable foot 108. The notch 116 in the bottom of the inner tube provides clearance for movement over the machine screw 111.

Figure 9:
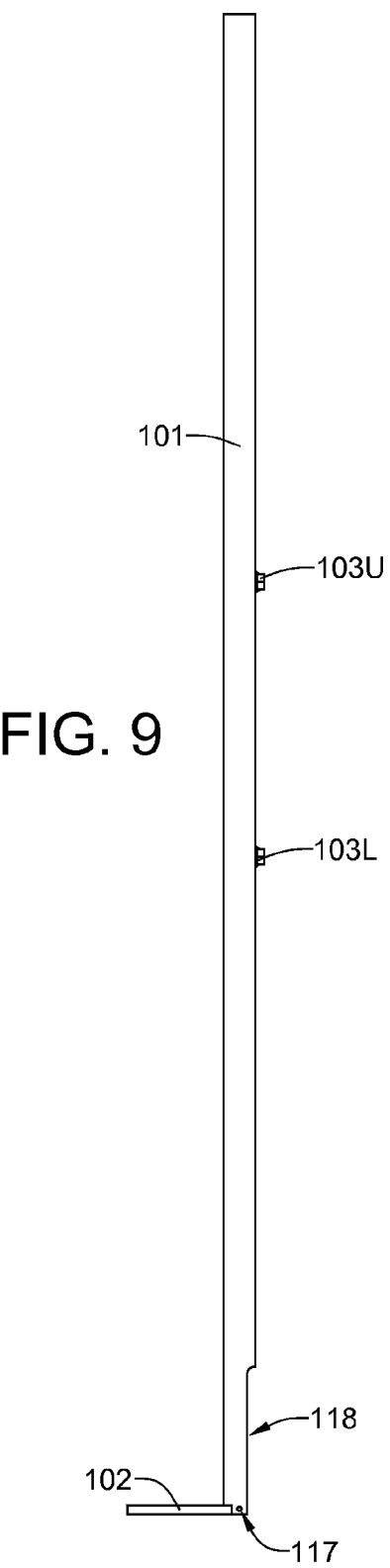
FIG. 9 is a side elevational view of the outer tube.

Referring now to FIG. 9, the outer tube 101 has a cutout 118, in which the movable foot 108 can slide.

Figure 10:
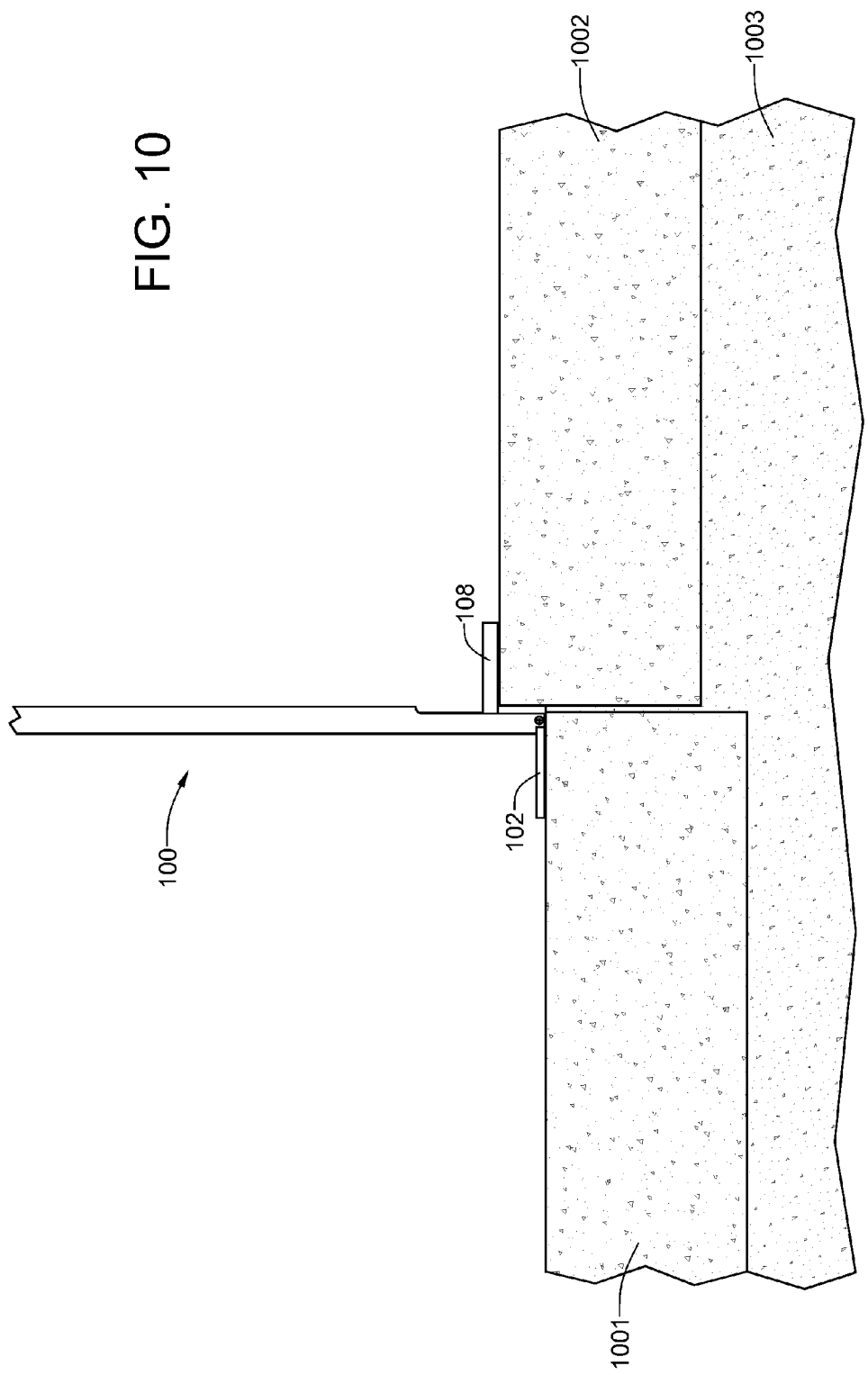
FIG. 10 is a side elevational view of a lower portion of the trip hazard measurement gauge positioned between two adjacent concrete slabs, with the movable foot of the inner tube resting on the uppermost slab and the stationary foot of the outer tube resting on the lower most slab.

Referring now to FIG. 10, the trip hazard measurement gauge 100 has been positioned between two adjacent concrete slabs 1001 and 1002, with the movable foot 108 resting on the uppermost slab 1002 and the stationary foot 102 resting on the lower most slab 1001. The difference in elevation between the two slabs 1001 and 1002 can be read on an extended portion of the rule 107 at the top of the trip hazard measurement gauge.

Although only a single embodiment of the new trip hazard measurement gauge is shown and described, it will be obvious to those having ordinary skill in the art that changes and modifications may be made thereto without departing from the scope and the spirit of the invention as hereinafter claimed.

What is claimed is:

1. A trip hazard measurement gauge comprising:
   an outer tube;
   a stationary foot orthogonally secured to a lower end of the outer tube;
   an inner tube slidable within the outer tube and extending through an upper end of the outer tube;
   a slidable foot orthogonally secured to a lower end of the inner tube; and
   at least one ruler secured to an upper end of the inner tube, said ruler having a measurement reading of zero distance when the stationary foot and the slidable foot are at the same level, said measurement reading increasing linearly as the slidable foot is moved upwardly with respect to the stationary foot;
   wherein a difference in elevation between two adjacent concrete slabs is measured by placing the slidable foot on an adjoining edge of the uppermost slab and pushing down on the outer tube until the stationary foot contacts the lowermost slab.

2. The trip hazard measurement gauge of claim 1, wherein the ruler is hidden inside the outer tube when the stationary foot and slidable foot are at the same level.

3. The trip hazard measurement gauge of claim 1, wherein said outer tube is of round cross section and said inner tube is of square cross section.

4. The trip hazard measurement gauge of claim 3, wherein an upper portion of the round tube is formed to create a square opening through which the inner tube exits.

5. The trip hazard measurement gauge of claim 3, wherein an upper portion of the round tube is fitted with polymeric plug having a square opening through which the inner tube exits.

6. The trip hazard measurement gauge of claim 1, wherein said inner and outer tubes and said stationary foot and said slidable foot are all fabricated from mild steel.

7. The trip hazard measurement gauge of claim 6, which further comprises lower and upper mounts, which are secured to the outer tube, each of said mounts having a threaded aperture for receiving a threaded fastener.

8. The trip hazard measurement gauge of claim 7, which further comprises a carrying strap, which is attachable to said lower mount with a first threaded fastener.

9. The trip hazard measurement gauge of claim 7, which further comprises a level assembly, which is attachable to said upper mount with a second threaded fastener, said level assembly enabling an estimator to position the trip hazard measurement gauge so that longitudinal axes of the inner and outer tubes are plumb.

10. The trip hazard measurement gauge of claim 1, which further comprises a coil spring that biases the inner tube with respect to the out tube so that the inner tube returns to a normally down position where the stationary foot and slidable foot are at the same level, and the ruler has a measurement reading of zero.

11. A trip hazard measurement gauge comprising:
    an outer tube of round cross section;
    a stationary foot orthogonally secured to a lower end of the outer tube;
    an inner tube of square cross section slidable within the outer tube and extending through an upper end of the outer tube;
    a slidable foot orthogonally secured to a lower end of the inner tube; and
    at least one ruler secured to an upper end of the inner tube, said ruler having a measurement reading of zero distance when the stationary foot and the slidable foot are at the same level, said measurement reading increasing linearly as the slidable foot is moved upwardly with respect to the stationary foot;
    wherein a difference in elevation between two adjacent concrete slabs is measured by placing the slidable foot on an adjoining edge of the uppermost slab and pushing down on the outer tube until the stationary foot contacts the lowermost slab.

12. The trip hazard measurement gauge of claim 11, wherein the ruler is hidden inside the outer tube when the stationary foot and slidable foot are at the same level.

13. The trip hazard measurement gauge of claim 11, wherein an upper portion of the round tube is crimped to form a square opening through which the inner tube exits.

14. The trip hazard measurement gauge of claim 11, wherein an upper portion of the round tube is fitted with polymeric plug having a square opening through which the inner tube exits.

15. The trip hazard measurement gauge of claim 11, wherein said inner and outer tubes and said stationary foot and said slidable foot are all fabricated from mild steel.

16. The trip hazard measurement gauge of claim 15, which further comprises lower and upper mounts, which are secured to the outer tube, each of said mounts having a threaded aperture for receiving a threaded fastener.

17. The trip hazard measurement gauge of claim 16, which further comprises a lower mount with a first threaded fastener, to which a shoulder strap can be secured.

18. The trip hazard measurement gauge of claim 16, which further comprises a level assembly, which is attachable to said upper mount with a second threaded fastener, said level assembly enabling an estimator to position the trip hazard measurement gauge so that longitudinal axes of the inner and outer tubes are plumb.

* * * * *